(No Model.)
J. HOCHHEIMER & L. M. SMITH.
ROAD WAGON GEAR.
No. 451,442. Patented Apr. 28, 1891.
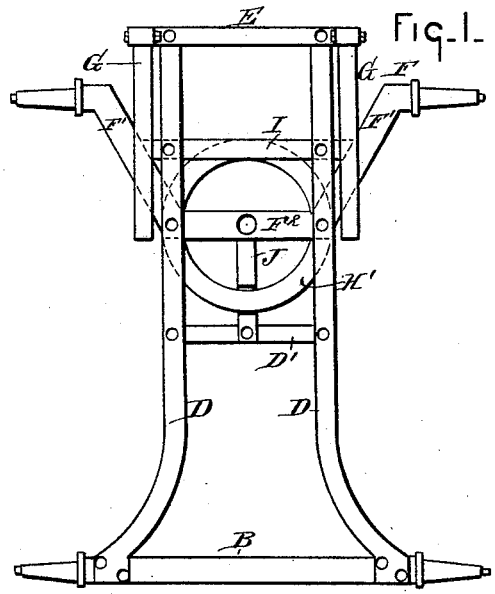
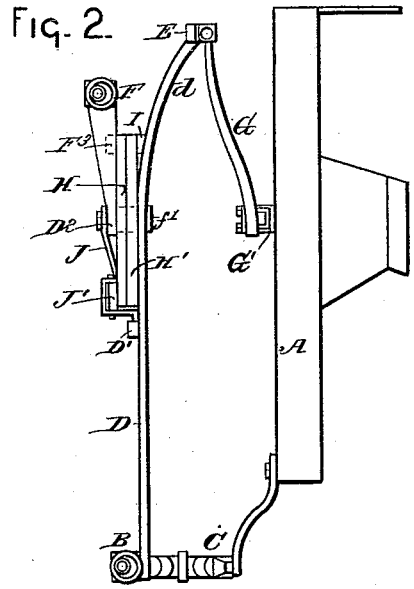
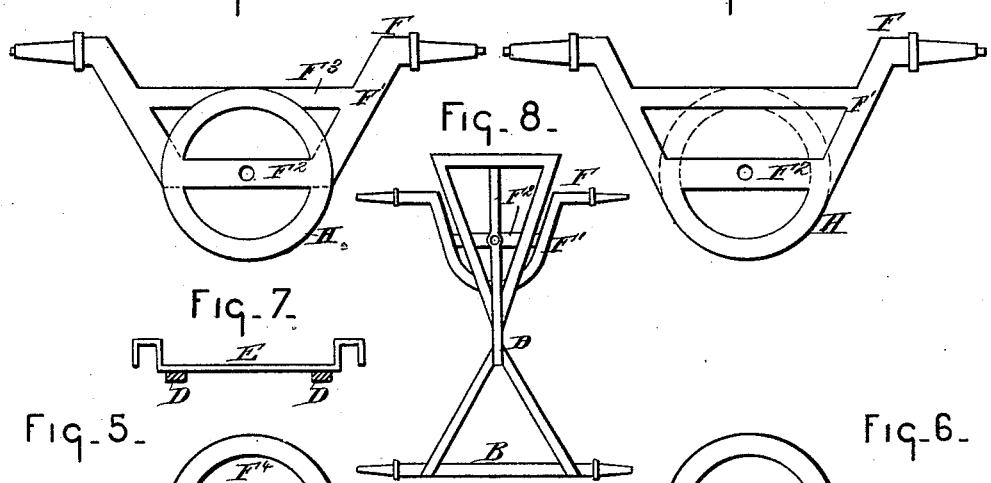
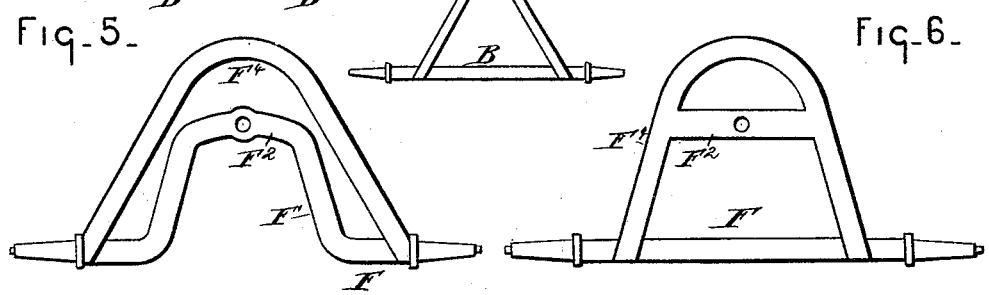
WITNESSES
F. Clough.
C. J. Shipley
INVENTOR
John Hochheimer
Loring M. Smith
By Wells N. Leggett & Co.
Attorneys.

UNITED STATES PATENT OFFICE.

JOHN HOCHHEIMER, OF HAMILTON, OHIO, AND LORING M. SMITH, OF ROMEO, MICHIGAN.

ROAD-WAGON GEAR.

SPECIFICATION forming part of Letters Patent No. 451,442, dated April 28, 1891.

Application filed September 10, 1890. Serial No. 364,523. (No model.)

*To all whom it may concern:*

Be it known that we, JOHN HOCHHEIMER and LORING M. SMITH, citizens of the United States, residing at Hamilton, Ohio, and Romeo, county of Macomb, State of Michigan, respectively, have invented a certain new and useful Improvement in Road-Wagon Gears; and we declare the following to be a full, clear, and exact description of the invention, such as will enable others skilled in the art to which it pertains to make and use the same, reference being had to the accompanying drawings, which form a part of this specification.

In the drawings, Figure 1 is a plan view of the running-gear of a vehicle embodying our invention. Fig. 2 is a side elevation of the same. Fig. 3 is a separate view of the axle and the parts associated therewith. Fig. 4 is a variation in which the bent portion of the axle is carried sufficiently far back to form a circular bearing beneath the circle-plate, there being a separate cross-piece for the reception of the king-bolt. Fig. 5 is another variation in which the axle itself is adapted to receive the king-bolt at the rear portion of its bend, and a separate hound-piece is connected with the axle and leads back to support the rear portion of the circle-plate. Fig. 6 is still another variation in which the axle is straight in the usual form, and a hound-piece is connected therewith and extends back to support the rear end of the circle-bar, with a cross-piece for the reception of the king-bolt. Fig. 7 is a separate view of the spring-supporting bar. Fig. 8 shows the device adapted for a single reach.

The purpose of our invention is to produce a running-gear which will permit the vehicle to make a very short turn and yet preserve the feature of a reach for connecting the front bolster with the rear axle or bolster.

To such end our invention consists in the features of construction and the combination or arrangement of parts, hereinafter described and claimed.

In carrying out our invention, A represents the body; B, the rear axle; C, any suitable rear spring mechanism; D, the reaches, and E is the forward spring-supporting bar.

F is the front axle, G the forward springs. The forward axle is bent backward at F', and at F² crosses over, and is provided at $f$ for the reception of the king-bolt $f'$. Upon this rearwardly-bent portion F' and concentric with the king-bolt is attached the lower section H of the circle-plate.

F³ is a cross-piece adapted to support the forward end of the circle-plate. The reach D is preferably made in two parts, as shown in Fig. 1, which extend forward and are curved upward at $d$, and provided with the cross-bar E at their forward ends, which cross-bar supports the forward springs G, and we prefer to make this cross-bar, although not necessarily so, of metal, and provide it with recesses, as shown in Fig. 7, for the reception of the eyes of the forward springs and their corresponding bolts.

H' is the upper section of the circle-plate. It is attached to the under side of the reach D, and a cross-piece I serves at the same time to support its forward portion and support also the upwardly-curved ends $d$ of the reach.

D' is a cross-bar, and J is a longitudinal bar leading therefrom to the cross-bar D² or the king-bolt and provided with an anti-friction roller J'. This bar J is designed simply to support the said roller beneath the rear end of the circle-bar or in such position as to support its rear end. The springs G are secured to the forward bolster G', on which the wagon-body rests. The hounds may be made of wood, if desired; but we prefer to make them of metal—iron or steel—and to flare them outwardly at the rear axle, substantially as indicated. So, also, we would have it understood that instead of a double reach, as shown, the rear parts might be united into a single reach and this latter projected forward over the circle-bar, so as to give the wheels more space to turn in beneath the wagon-body. Such a variation is shown in Fig. 8. It is apparent that in turning the effect is to thrust against the king-bolt in the opposite direction and so throw the forward end of the vehicle somewhat in the direction of the thrust. This enables the vehicle to be turned in much less space. So, again, this construction brings the forward wheels well to the front of the vehicle, where they should be, while at the same time the pole may be turned to one side— as, for instance, where it is desired to back up to a pavement and stand between the pavement and a closely-adjacent car-track and the wheels be well back out of the way, farther than would be possible if the same wheels were pivoted at the middle of a straight axle. While the axle supports the reach, the reach serves in turn, through the medium of the roller J', to support the axle against the tendency to tilt downwardly at its rear end, and the roller serves to relieve the friction in turning. This device admits of many variations without departing from our invention, and we would have our claims construed as covering these and other obvious modifications. Thus, as shown in Fig. 4, the axle may be bent backward and curved to conform to and rest beneath the rear end of the circle-plate, in which case the cross-section $F^2$ would be either attached to the axle or made solid therewith. So, again, as shown in Fig. 5, the axle might, as in Fig. 3, be bent so that its cross portion $F^2$ shall receive the king-bolt, and a separate hound-piece might be attached thereto and carried back beneath the rear end of the circle-bar, as shown at $F^4$; or, as shown in Fig. 6, the axle may be made straight, as usual, and a hound-piece $F^4$ be connected therewith to extend back beneath the rear end of the circle-bar, and a cross-bar $F^2$ be provided for the king-bolt; or, in a construction of this character shown in Fig. 6 the part of $F^4$ projecting beyond the cross-bar $F^2$ might be omitted and the circle-bar be arranged and supported substantially as shown in Fig. 3. We would also have it understood that the circle-plate may in some cases be dispensed with. Thus, as shown in Fig. 6, the reach might move along the upper portion of the loop $F^4$ and the roller J' travel directly against the lower surface of the said loop. This construction, though not so desirable as one which employs the circle-plate, may answer a good purpose in certain kinds of vehicles.

What we claim is—

1. A vehicle-axle bent rearwardly and provided with the lower section of the circle-plate, the cross-bar located between the side portions of the rearwardly-bent part of the axle, and the king-bolt passing through the said cross-bar in advance of the rear part of the bent portion of the axle, substantially as shown and described.

2. The combination, with a vehicle, of a forward axle having a rearward projection, and the lower portion of a circle-plate supported thereby to the rear of the vertical plane of the spindles of said axle, and a reach projecting forward above said circle-plate and having the upper section of the circle-plate connected therewith, and said reach supporting the body of the vehicle at its forward end some distance in front of the king-bolt, substantially as and for the purposes described.

3. A vehicle having its forward axle provided with a rearward projection, a section of the circle-plate secured thereto to the rear of the line of the axle-spindles, a reach extending forward over the said circle-plate and having the upper section of the circle-plate attached thereto, a spring-supporting bar attached to the forward extremity of the reach, springs engaged therewith upon which the body rests, and the vehicle-body, substantially as and for the purposes described.

4. The combination, with the forward axle having a rearward projection, of a circle-plate secured thereto and a reach projecting forward above the circle-plate and provided with a supporting-roller sustained in position beneath the rear portion of the circle-bar and adapted to support the latter, substantially as described.

5. A vehicle consisting of front and rear axles, the forward axle having a rearward projection, a circle-plate located to the rear of the line of its spindles and supported by said rearward projection, a double reach projecting from the rear axle forward above the circle-plate, to which the upper section of the circle-plate is secured, said reach projected considerably forward of the king-bolt and united at its forward end by a spring-supporting bar, and in connection therewith a supporting-roller J', sustained by the reach and adapted to support from beneath the rear portion of the circle-plate, substantially as and for the purposes described.

6. The combination, with the forward axle having a rearward projection to which the lower section of the circle-plate is attached, of a reach to which the upper section of the circle-plate is attached, said reach made double over that portion above the circle-plate and having the upper section of the circle-plate secured thereto and with its ends projecting forward and adapted to sustain the forward end of the vehicle-body, substantially as described.

7. The combination, with the vehicle-axle, of a circle-plate engaged therewith and located entirely to the rear of the line of its spindles, in combination with a reach to which is attached the upper section of the circle-plate, said circle-plate being independent of the bar which directly supports the forward portion of the body, substantially as described.

In testimony whereof we sign this specification in the presence of two witnesses.

JOHN HOCHHEIMER.
LORING M. SMITH.

Witnesses:
M. A. REEVE,
WELLS W. LEGGETT.